(12) United States Patent
Schelling (10) Patent No.: US 6,766,474 B2
(45) Date of Patent: Jul. 20, 2004

(54) MULTI-STAGED BIOS-BASED MEMORY TESTING

(75) Inventor: Todd A. Schelling, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 09/745,974

(22) Filed: Dec. 21, 2000

(65) Prior Publication Data
US 2002/0083369 A1 Jun. 27, 2002

(51) Int. Cl.⁷ .............................................. G06F 11/00
(52) U.S. Cl. ...................................................... 714/36
(58) Field of Search ............................. 714/30, 36, 42, 714/718; 713/2

(56) References Cited

U.S. PATENT DOCUMENTS

| | | | | |
|---|---|---|---|---|
| 5,581,736 A | * | 12/1996 | Smith | 711/170 |
| 5,748,877 A | * | 5/1998 | Dollahite et al. | 714/36 |
| 5,904,733 A | * | 5/1999 | Jayakumar | 713/2 |
| 6,035,420 A | * | 3/2000 | Liu et al. | 714/25 |
| 6,108,781 A | * | 8/2000 | Jayakumar | 713/2 |
| 6,401,198 B1 | * | 6/2002 | Harmer et al. | 713/1 |
| 6,401,202 B1 | * | 6/2002 | Abgrall | 713/2 |
| 2002/0083369 A1 | * | 6/2002 | Schelling | 714/36 |

\* cited by examiner

*Primary Examiner*—Robert Beausoliel
*Assistant Examiner*—Bryce P. Bonzo
(74) *Attorney, Agent, or Firm*—Paul E. Steiner (57) ABSTRACT

The BIOS of a multiple processor system passes partial control to the operating system following an abbreviated power-on initialization. The BIOS program retains control of one or more processors and any memory that was untested during power-on. While the operating system is loaded and the system is operational, the BIOS program tests the retained memory. The BIOS program then relinquishes control of the retained memory and processor(s) during runtime to the operating system.

13 Claims, 7 Drawing Sheets

MULTI-STAGED BIOS-BASED MEMORY TESTING

BACKGROUND

This invention relates to basic input/output systems (BIOS) programs and, more particularly, to improved memory testing.

In a processor-based system, powering on the system is commonly known as a "boot" process. The boot process is performed by a program, usually located in a read-only memory (ROM) or flash memory of the processor-based system. The ROM/flash program includes a software program known as the basic input/output system, or BIOS. The BIOS program executes commands such that the various circuitry of the processor-based system may be initialized. The BIOS program also includes functions that may be used by software, including operating systems, for communicating with different devices in the processor-based system.

Upon receiving power to the processor-based system, the BIOS program immediately begins execution. The BIOS performs initialization functions, such as detecting and testing the memory, the display, the non-volatile media, such as hard disk and floppy disk drives, and so on. In some systems, an abbreviated power-on, or "quick-boot," may be available, which may test some, but not all circuitry.

Once the BIOS program completes initialization and testing of the system, control is typically transferred to an operating system, usually located on the hard disk drive. Once the operating system gains control of the processor-based system, all run-time operations, including any execution of application programs, are controlled by the operating system. The operating system may or may not utilize the BIOS functions in communicating with the hardware of the processor-based system.

Typically, the BIOS program performs minimal system initialization, followed by memory sizing, error-correcting code (ECC) memory filling if required, and varying levels of memory testing. Once the memory is deemed sound by the program, the remainder of the system is initialized. Only after all these memory-related tasks are complete will the BIOS program transfer control of the system, including processors, memory, and input/output (I/O), to the operating system. This serial approach to initialization results in delays before the system is available for runtime operation.

The current memory technology allows for very inexpensive processor-based systems to nevertheless include a large amount of memory. These very large memory arrays may create significant delay during system initialization. Exhaustive tests on large amounts of memory may take 10, 20, or even 30 minutes to complete. Where the memory is tested in the BIOS, the system is required to be "off-line" during the memory testing.

Thus, there is a continuing need to quickly boot an operating system on a processor-based system while still performing a thorough test of the memory.

DETAILED DESCRIPTION

Figure 1:
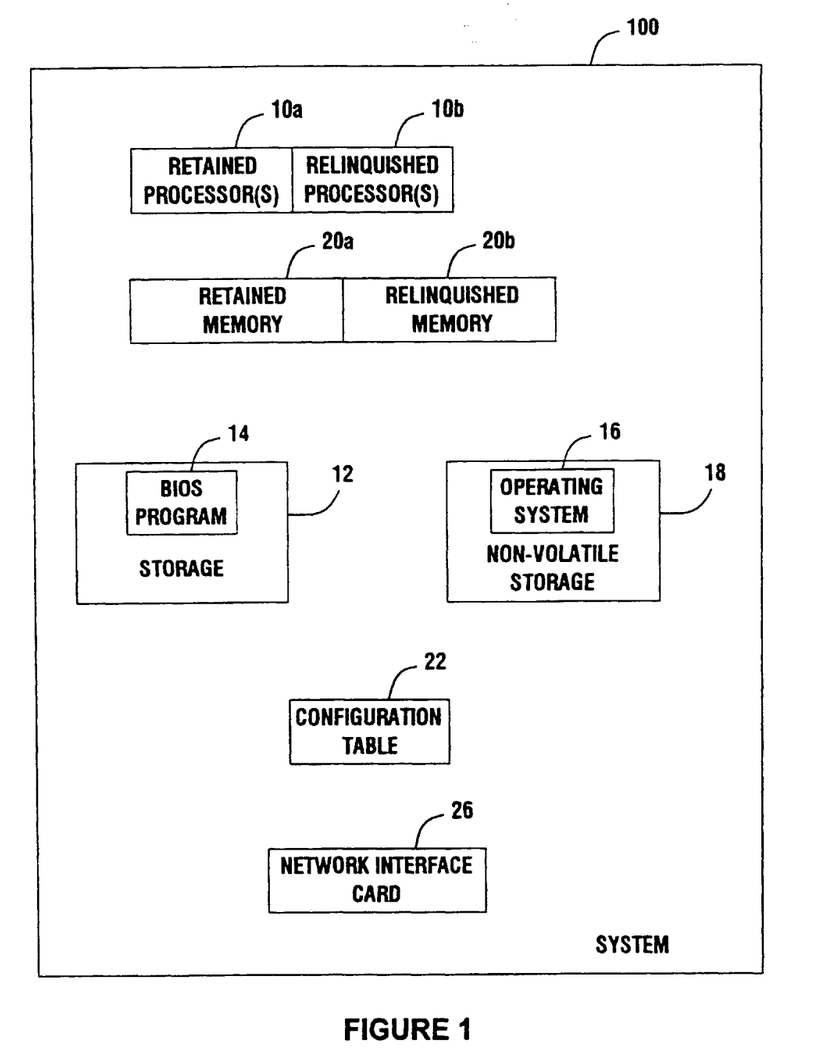
FIG. 1 is a block diagram of a system according to one embodiment of the invention.

In FIG. 1, according to one embodiment, a system 100 includes two or more processors 10. The processors 10 may include the PENTIUM® family of processors and the 80×86 families of processors from Intel Corporation, as examples.

The system 100 further includes a memory 20 that may be divided into portions. The memory 20 may include random access memory (RAM), dynamic random access memory (DRAM), synchronous DRAM (SDRAM), static ram (SRAM), or Rambus® DRAM (RDRAM), as examples.

In one embodiment, software for both power-on and run-time operation of the system 100 are included. A BIOS program 14 executes as the system 100 receives power. As explained above, the BIOS program 14 performs initialization and testing of components within or connected to the system 100. Such components may include video and audio devices, mass storage media, keyboard and mouse circuitry, serial and parallel ports, memory, and so on.

In one embodiment, the BIOS program 14 resides in a storage 12 such as a read-only memory (ROM). In a second embodiment, the storage 12 is a flash memory device. In other embodiments, a different power-on program that is not BIOS-based may be utilized in performing the operations described herein.

For run-time operation, the system 100 further includes an operating system program 16. In one embodiment, the operating system program 16 resides in a non-volatile storage device 18, such as a hard disk drive or compact disk (CD) ROM. In a second embodiment, the operating system program 16 does not reside on the system 100. Instead, the system 100 is accessible to a network (not shown) by a network interface card 26. Once the network connection is made, the operating system software 16 may be downloaded to the system 100.

In one embodiment, the BIOS program 14 retains control of a portion of the system 100 instead of relinquishing full control of the system 100 to the operating system 16. This enables the BIOS program 14 to minimally configure and test the system 100 such that the operating system may be "booted" more expeditiously. Further, the portion of the system that was not relinquished to the operating system 16 may be fully initialized and tested during runtime, e.g., after the system 100 is fully capable.

Accordingly, in FIG. 1, the processor 10a is deemed a "retained" processor, e.g., that processor that is retained by the BIOS program 14. The processor 10b is known as a "relinquished" processor, as one relinquished to the operating system 16 by the BIOS program 14. More than one processor 10a may be retained and more than one processor 10b may be relinquished. Like the processors 10, the memory 20 may be divided into retained memory portion 20a and relinquished memory portion 20b.

In one embodiment, the system 100 further includes a configuration table 22, which is accessible to both the BIOS program 14 and the operating system program 16. The configuration table 22 includes information about resources within and connected to the system 100. In particular, the configuration table 22 supplies the operating system 16 with the amount of memory 20 available in the system 100 as well as the number and type of processors 10.

Typically, the BIOS of a processor-based system performs initialization of system components, including memory. Memory initialization may include sizing the memory, ECC filling, and various forms of memory testing. Only after these tasks are complete will the BIOS transfer control of the system, including processors, memory, and input/output (I/O) to the operating system. Particularly where the system has large amounts of memory, this serial approach to initialization delays runtime use of the system.

Recently, hardware, software, and operating system technologies have evolved to allow systems to "hot add," "hot remove," and "hot replace" system components. Using such technology, processors and memory, for example, may be added and removed while a system is running.

For example, under the Advanced Configuration and Power Interface (ACPI) Specification, processors may be ejected or dynamically inserted into a system during runtime operation. Likewise, other hardware, such as memory, may be "hot added" or "hot removed." The ACPI Specification, revision 2.0, was published by a consortium (Compaq Computer Corporation, Intel Corporation, Microsoft Corporation, Phoenix Technologies, Ltd., and Toshiba Corporation), on Jul. 27, 2000.

In one embodiment, the system 100 has the ability to dynamically add resources to and remove resources from the system 100 during runtime operation. In one embodiment, the BIOS program 14 and the operating system 16 implement the dynamic addition or removal of resources according to the ACPI Specification, Revision 2.0. Under ACPI, the addition of a device to the system 100 causes an interrupt to be sent to the operating system 16.

The operating system 16 is then informed, through an interpreted language, known as ACPI Source Language, or ASL, of the additional device. Briefly, the ASL language includes device and method constructs, wherein the device construct identifies the device being added (e.g., processor, memory) and the method construct describes attributes of the device. Thus, in one embodiment, the operating system 16 determines the basis for the interrupt using the ASL code. From this information, the operating system 16 may locate the device. In addition to memory or processor, the device may be a storage, a network interface card, and so on.

Using this dynamic add and remove capability, according to one embodiment, the BIOS program 14 relinquishes control of less than all resources of the system 100 to the operating system program 16. Instead, the BIOS program 14 retains control of one or more processors, such as the processor 10a, so that the BIOS program 14 may continue executing after the operating system program 16 has been loaded and executed.

By retaining one or more processors 10 the BIOS program 14 may execute simultaneously with the operating system program 16, each using distinct processors 10. In other words, the BIOS program 14 may use the retained processor(s) 10a while the operating system 16 uses the relinquished processor(s) 10b.

The retained processor(s) 10a and the relinquished processor(s) 10b share resources in the system 100, including the memory 20. Accordingly, arbitration between the two or more processors 10 for control of system resources is handled just as in any system employing multiple processors that execute simultaneously. In one embodiment, a North Bridge controller is used to arbitrate between the use of system resources (see FIG. 7).

Further, in one embodiment, the BIOS program 14 retains a portion of the memory 20 (retained memory 20a) while relinquishing control of the remainder of the memory 20 (relinquished memory 20b) to the operating system 16. In one embodiment, the relinquished memory 20b includes enough of the total memory 20 to enable the system 100 to be fully functional. As will be shown, below, the BIOS program 14 initializes and tests the retained memory 20a. Following the memory test, the retained memory 20a may be released to the operating system 16, or, in other words, become relinquished memory 20b.

In one embodiment, the BIOS program 14 releases the memory 20 in stages, e.g., tests a first portion of retained memory 20a, releases the first portion, tests a second portion of retained memory 20a, releases the second portion, tests a third portion of retained memory 20a, releases the third portion, and so on. In a second embodiment, the BIOS program 14 tests all the retained memory 20a first, then releases the retained memory 20a to the operating system 16.

Likewise, in one embodiment, the BIOS program 14 releases the processors 10 once their use is exhausted. Where the retained processors 10a include multiple processors, each testing multiple portions of memory 20a in parallel, a retained processor 10a may be released to the operating system 16 once memory testing for the associated memory 20a is complete. Alternatively, the BIOS program 14 may release all the retained processors 10a to the operating system 16 simultaneously, following completion of the testing of all the retained memory 20a.

Figure 2:
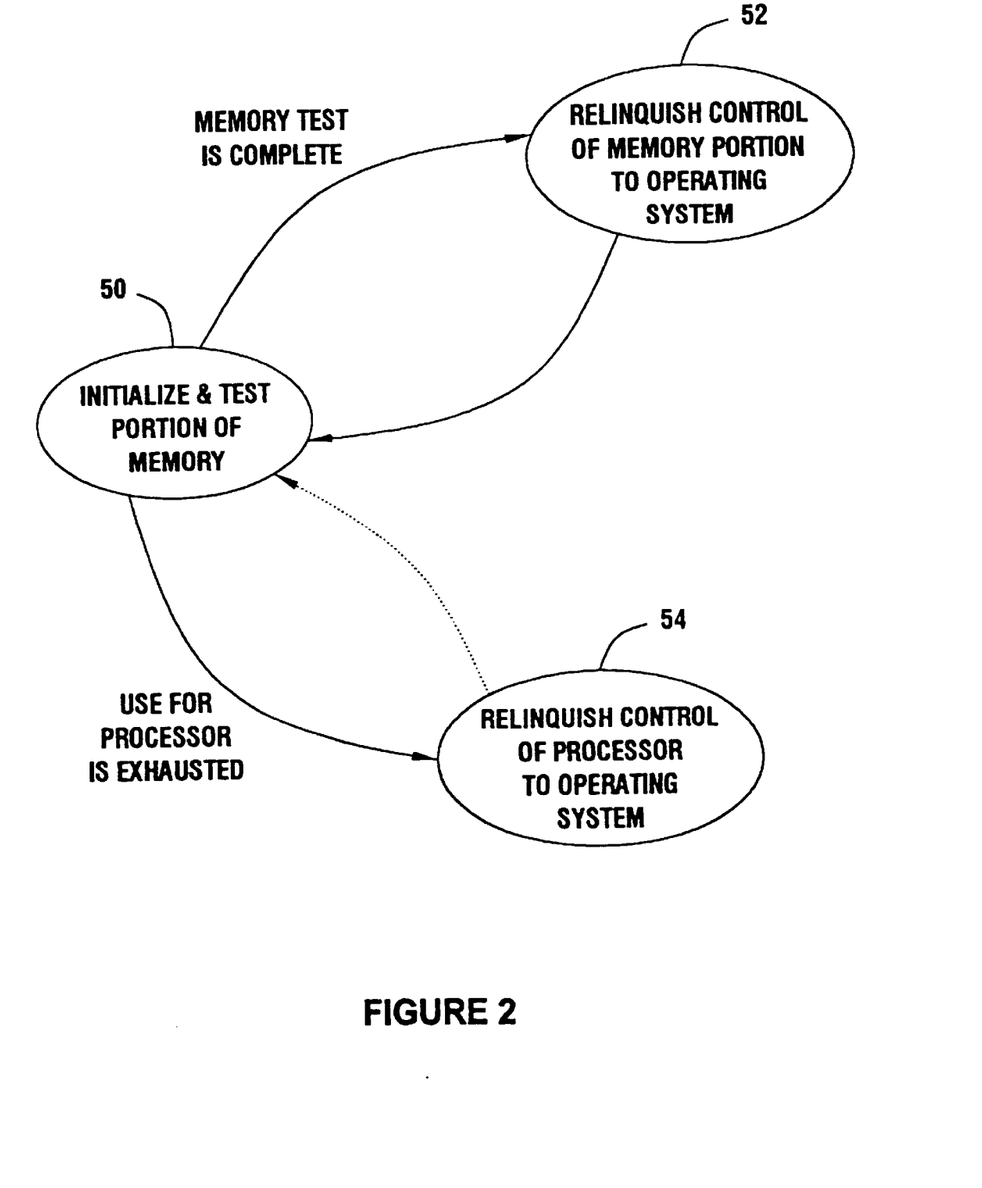
FIG. 2 is a state diagram illustrating operation of the BIOS according to one embodiment of the invention.

In FIG. 2, a state diagram depicts the operation of the BIOS program 14, according to one embodiment. Assume the BIOS program 14 is executing on a retained processor 10a in order to test retained memory portion 20a. The BIOS program 14 initializes and tests a portion of the retained memory 20a (state 50). Once the test is complete, the BIOS program 14 relinquishes control of the retained memory portion 20a to the operating system 16 (state 52).

Where additional retained memory 20a is available for testing, the BIOS program 14 may perform another initialization and test (state 50). Once the initialization and testing of the retained memory 20a is complete, the BIOS program 14 may relinquish control of the retained processor 10a to the operating system 16 (state 54).

Where the processor 10a, is the last processor retained by the BIOS program 14, total control of the system 100 has been relinquished to the operating system 16. However, where the BIOS program 14 retains additional processors 10a, additional initialization and testing of the remaining retained memory 20a may still be pending, as indicated by the dotted line in the state diagram of FIG. 2.

Although the memory 20 may take a long time to initialize and test, the BIOS program 14 may retain other resources in order to expedite runtime use of the system 100. Depending on the resources retained, the runtime operation of the system 100 may be limited to fewer than all the operations for which the system 100 is capable. For some operating environments, however, the tradeoff in runtime capability is well worth the expedited availability of runtime operation.

Figure 3:
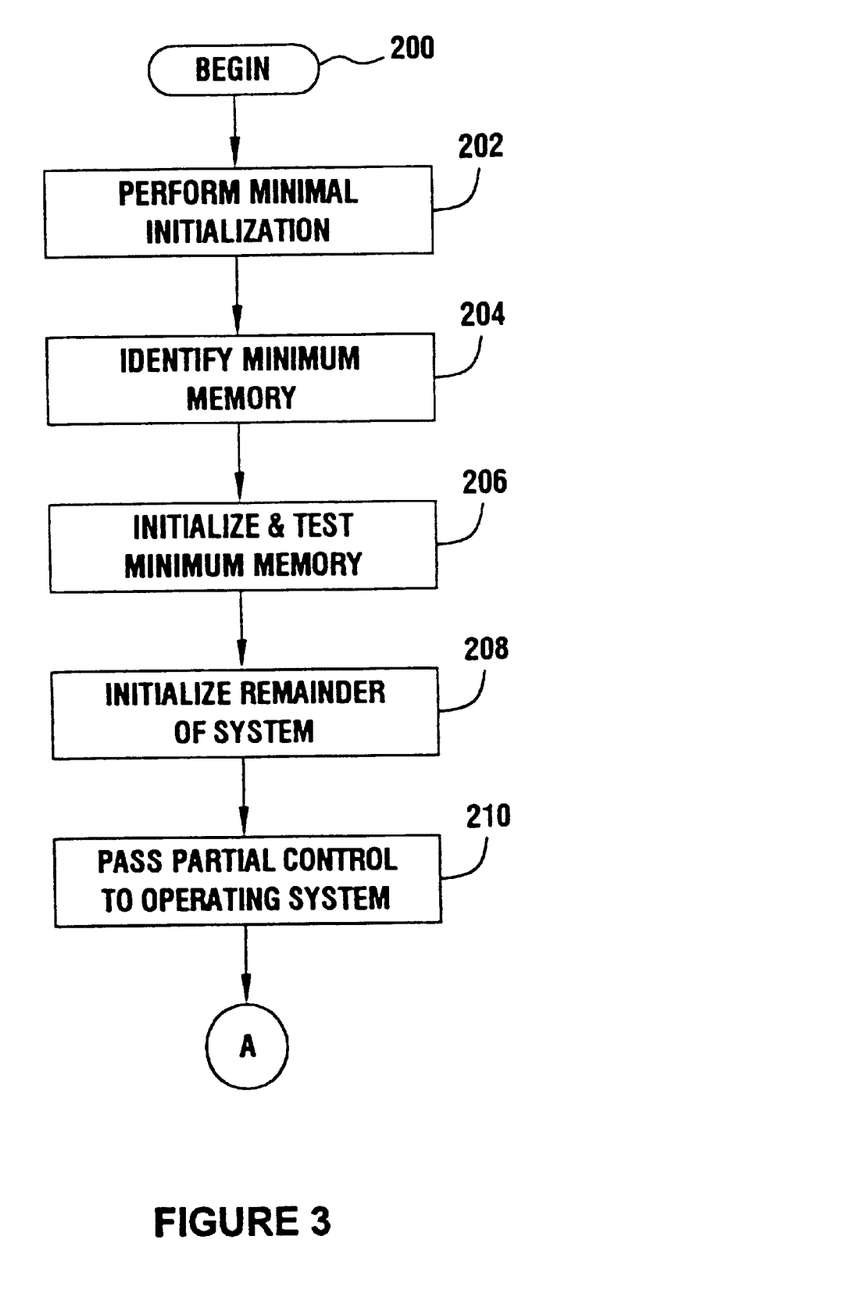
FIG. 3 is a flow diagram illustrating operation of the system according to one embodiment of the invention.

In FIG. 3, a flow diagram illustrates operation of the BIOS program 14, according to one embodiment, in preparing to pass partial control of the system 100 to the operating system 16. The BIOS program 14 performs minimal system initialization (block 202). The amount and type of system initialization performed may be system-dependent. In one embodiment, the minimal system initialization includes initialization and testing of all processors 10, both retained 10a and relinquished 10b, in the system 100. In a second embodiment, all system resources are initialized and tested except the retained memory 20a.

The BIOS program 14 further identifies a minimum amount of memory 20 that is to be passed to the operating system 16 (block 204). In one embodiment, the minimum amount of memory 20 is the amount of relinquished memory 20b. The relinquished memory 20b is then initialized and tested (block 206) so that it may be passed on to the operating system 16. The BIOS program also initializes the remainder of the system 100 (block 208). Once the partial system is initialized an tested, control is passed to the operating system 16 (block 210).

Figure 4:
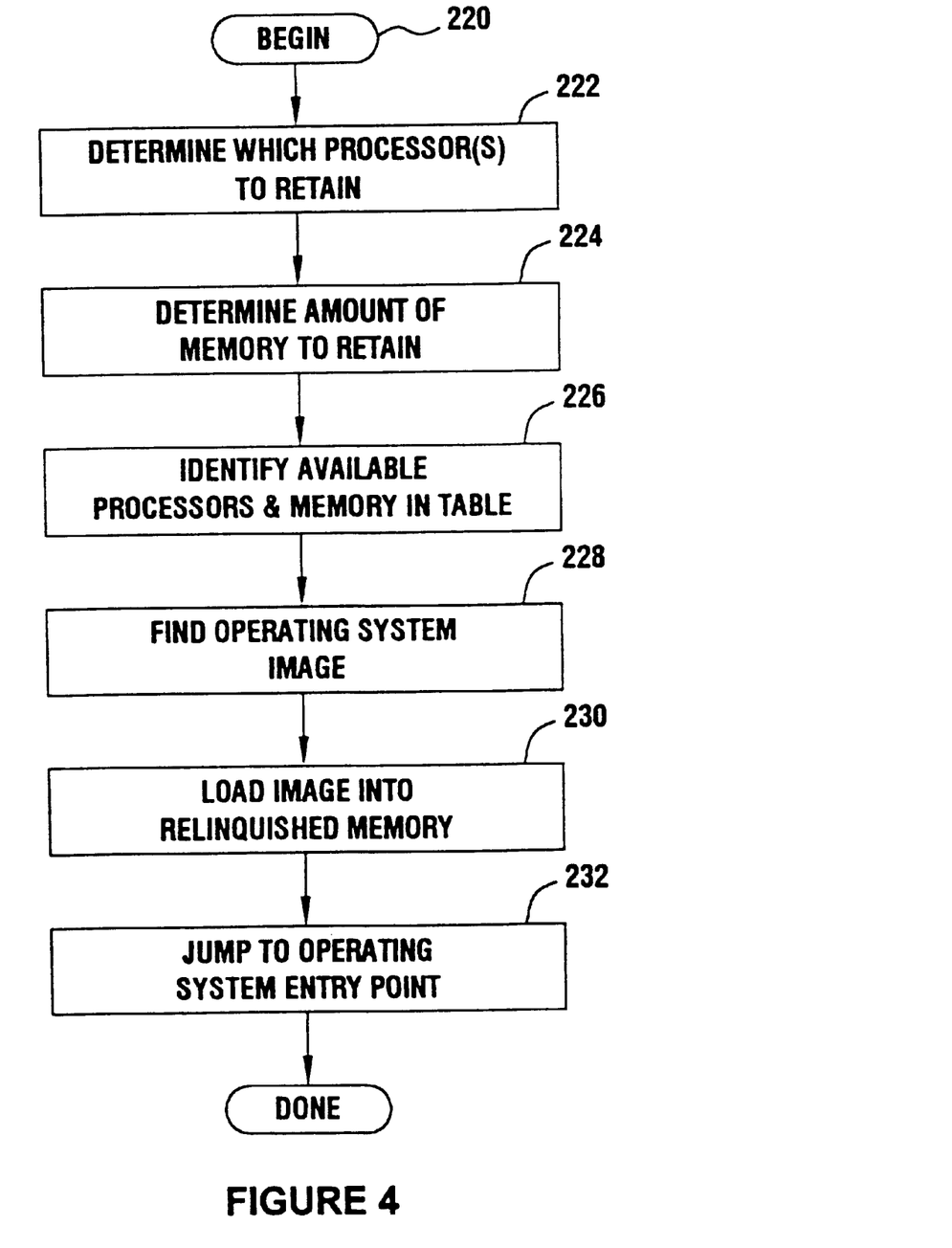
FIG. 4 is a flow diagram illustrating how the BIOS passes partial control to the operating system according to one embodiment of the invention.

In FIG. 4, a flow diagram illustrates how the BIOS program 14 passes partial control of the system 100 to the operating system 16, according to one embodiment. The BIOS program 14 determines which and how many processors 10 to retain (block 222), e.g., not pass on to the operating system 16. The BIOS program 14 also decides how much of the memory 20 to retain (block 224). Such determinations may be based upon the system capability, the environment in which the system operates, and other factors.

The BIOS program 14 updates the configuration table 22, which is accessible to the operating system 16 (block 226). In one embodiment, the configuration table 22 includes fields for specifying the number of processors 10, along with identifying features for each processor. The configuration table 22 also indicates the amount of memory 20 in the system, as well as the type of memory and other configuration information.

In one embodiment, the number of processors 10 and the amount of memory 20 listed in the configuration table 22 is less than the number of processors in the system 100. Instead, the configuration table 22 reflects the number of relinquished processors 10b and the amount of relinquished memory 20b (e.g., the number of processors 10b and the amount of memory 20b to be relinquished to the operating system 16). In essence, the BIOS program 14 is lying to the operating system 16. By identifying only the system resources that are to be relinquished to the operating system 16, the BIOS program 14 may retain some resources for its own use.

Next, according to one embodiment, the BIOS program 14 finds the image of the operating system 16 (block 228). The image may reside on the system 100, such as in the non-volatile storage 18, a compact disk (CD) read-only memory (ROM), or other magnetic medium. Or, the image may be retrievable to the system 100, such as by downloading the image over a network. Once the operating system 16 image is found, in one embodiment, the image is loaded into a portion of the relinquished memory 20b (block 230).

According to one embodiment, the BIOS program 14 jumps to an entry point in the image (block 232), which commences the execution of the operating system 16. The BIOS program 14, however, continues to run on one of the retained processors 10a of the system 100.

Figure 5:
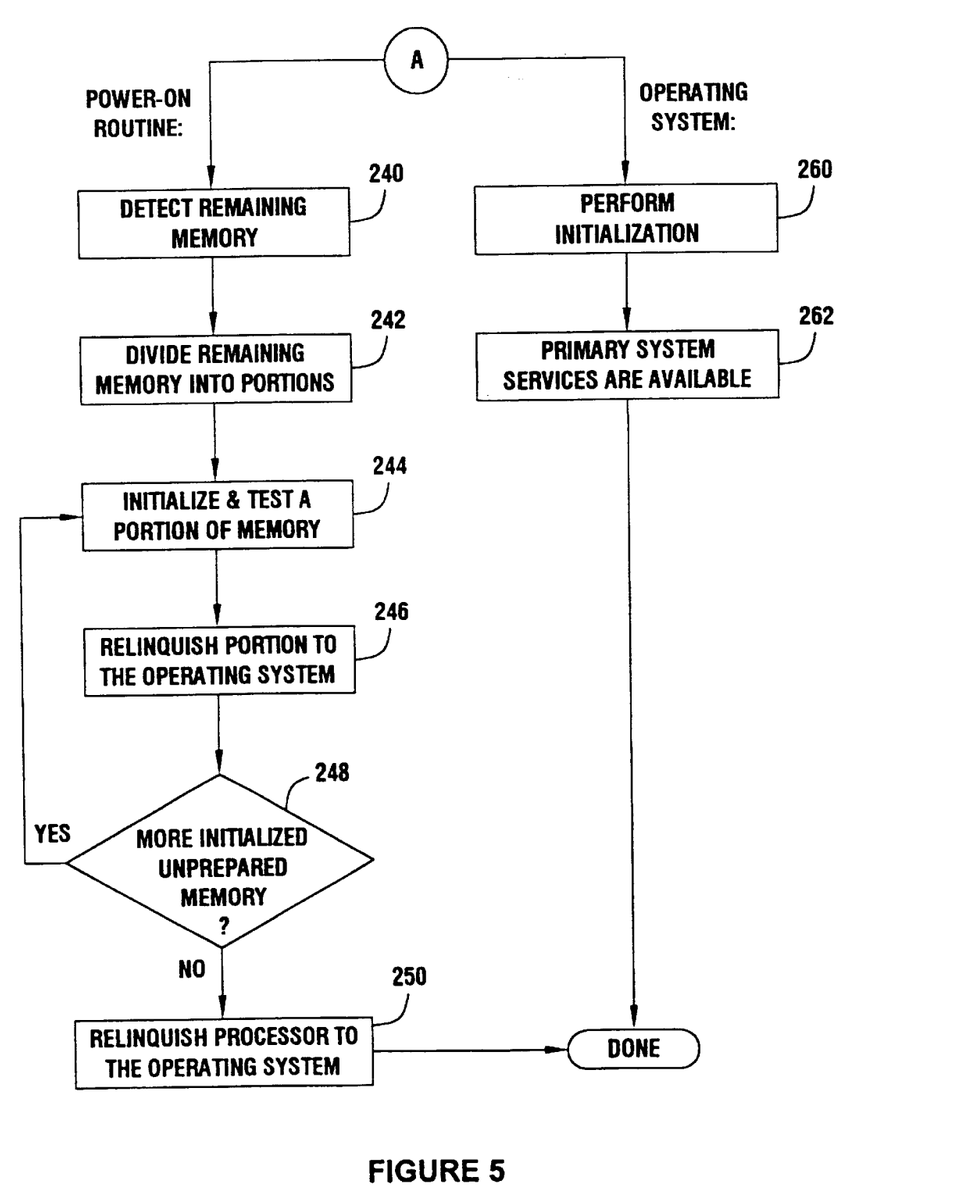
FIG. 5 is a flow diagram illustrating parallel operation between the BIOS and operating system programs according to one embodiment of the invention.

In FIG. 5, the parallel operation of the BIOS program 14 and the operating system 16 is illustrated in a flow diagram. In one embodiment, the parallel operations begin when the BIOS program 14 jumps to an entry point in the image (block 232 of FIG. 4). Because the BIOS program 14 retains one or more processors 10a, the BIOS program 14 may continue executing.

In the sequence of FIG. 5, the BIOS program 14 retains only one processor 10. Accordingly, the flow diagram depicts two parallel threads: one for the BIOS program 14 and one for the operating system. However, where the BIOS program 14 retains more than one processor, additional BIOS program 14 threads may operate simultaneously in testing the retained memory 20a of the system 100.

In one embodiment, the BIOS program 14 detects the retained memory 20a (block 240) and divides the retained memory 20a into portions (block 242). A portion of the memory 20a is initialized and tested (block 244). In one embodiment, once the testing is complete, the portion is relinquished to the operating system 16 (block 246).

The BIOS program 14 determines whether more retained memory 20a is present in the system 100 (diamond 248). If so, another portion of the retained memory 20a is initialized and tested (block 244). Otherwise, the retained processor 10a is relinquished to the operating system 16 (block 250).

While the BIOS program 14 is testing the retained memory 20a, the operating system 16 may perform its own system initialization (block 260). The primary system services become available (block 262), allowing the system 100 to be fully utilized for runtime operation.

In one embodiment, to relinquish control of the processor 10 or the memory 20, the BIOS program 14 sends an interrupt to the operating system 16. The ACPI specification, revision 2.0, defines methods and events that allow the BIOS program 14 to communicate with the operating system 16. The operating system 16 invokes an interpreted language, such as ASL, that allows the operating system 16 to identify the source of the interrupt: the addition of a new processor to the system. In one embodiment, the operating system 16 receives the retained processor 10a in accordance with the ACPI specification, revision 2.0.

Figure 6:
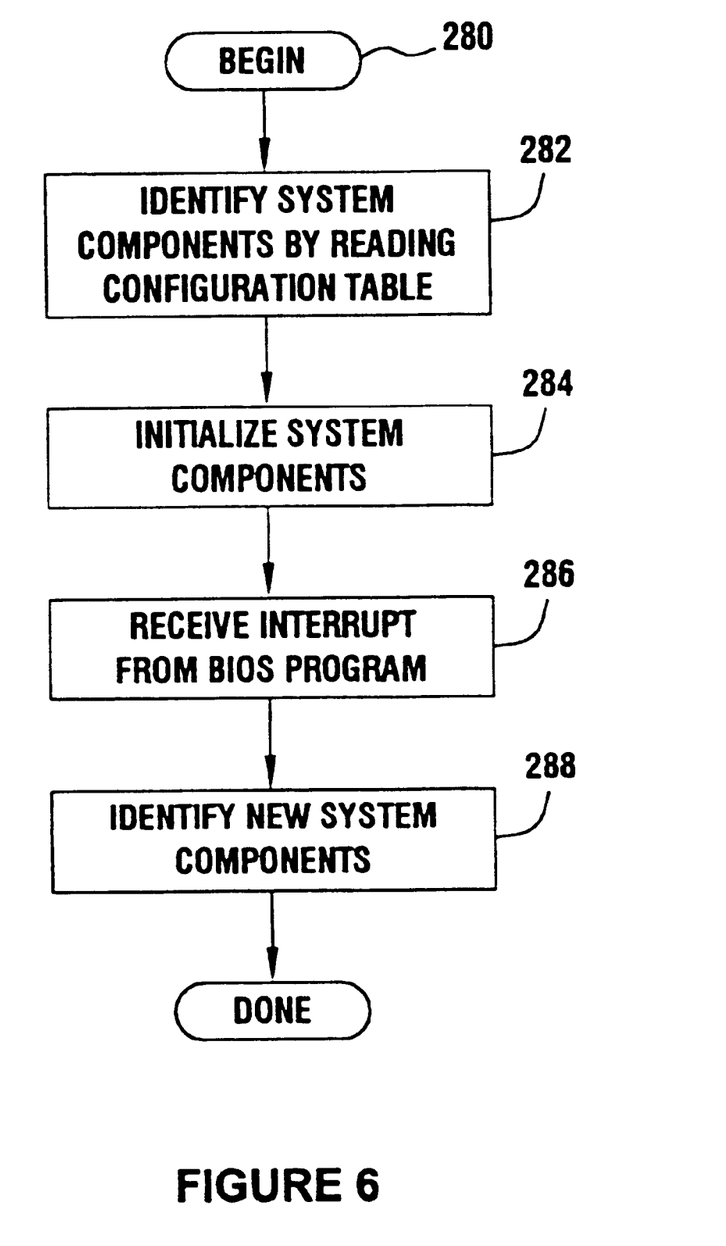
FIG. 6 is a flow diagram illustrating operation of the operating system according to one embodiment of the invention.

In FIG. 6, according to one embodiment, the operating system 16 begins execution once the BIOS program 14 has jumped to the operating system entry point (block 232 of FIG. 4). The operating system 16 identifies system components by reading the configuration table 22 (block 282). From the system resource information identified in the configuration table 22, the operating system 16 initializes the system components (block 284). For some devices, the initialization may include testing operations.

The operating system 16 is fully operational, to the extent that system devices were made available to the operating system 16 by the BIOS program 14. However, the BIOS program 14 may retain some system devices and perform operations simultaneously with the running of the operating system 16, as described, above. Where the BIOS program 14 is ready to relinquish the retained devices, in one embodiment, the BIOS program 14 sends an interrupt to the operating system 16 (block 286).

In addition to interrupting the operating system 16, the operating system 16 is informed of the newly relinquished device or devices. In one embodiment, the operating system 16 is informed by receiving ACPI constructs (e.g., methods), written in ASL, from the BIOS program 14. These constructs supply information about the new device(s) to the operating system 16. Accordingly, the operating system 16 may determine what new circuitry is being relinquished (block 288). These steps (284, 286, and 288) may repeat until the BIOS program 14 has released all retained resources.

One benefit of the operations described herein is the reduction of system downtime, in some embodiments. By testing the memory 20 in multiple stages, the operating system 16 gains control of the system 100 sooner that if all the memory 20 was initialized and tested. The downtime savings may be significant, particularly where the system 100 includes a substantial amount of memory 20. Some large systems, for example, may take twenty to thirty minutes to boot.

A second benefit of these operations is the identification of memory errors, due to the thorough testing of the memory 20 by the BIOS program 14 after the operating system 16 is loaded. Some prior art system avoid the lengthy boot process by running faster memory tests. Unfortunately, these faster tests are often less effective and enable more memory errors to escape unnoticed. By instead utilizing a staged memory test, more exhaustive memory testing may be performed without compromising the availability of the system for runtime use.

Figure 7:
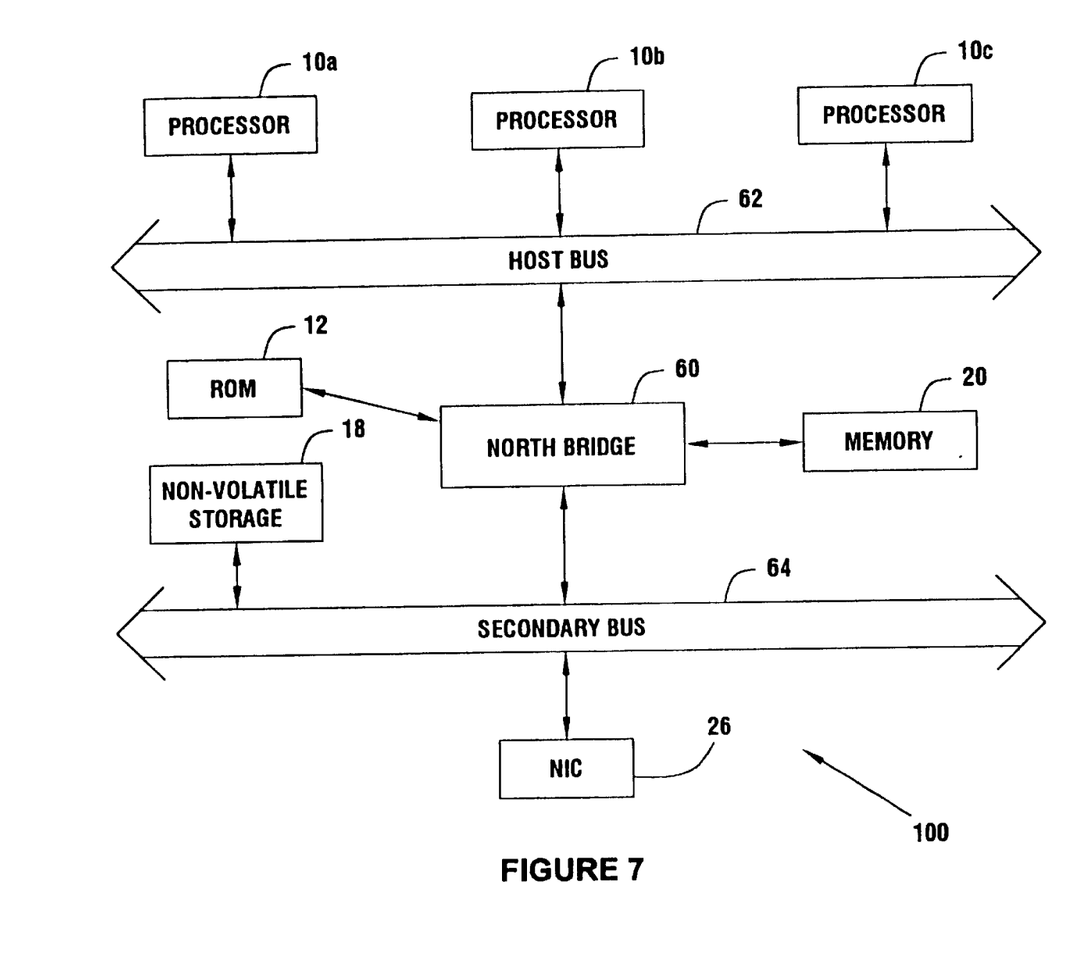
FIG. 7 is a functional block diagram of a system according to one embodiment of the invention.

In FIG. 7, according to one embodiment, a functional block diagram of the system 100 includes three processors 10a, 10b and 10c connected to a host bus 62. The host bus 72 may be an Intel PENTIUM® PRO bus, as one example. ("See the Pentium Pro Processor Specification," update release May 1998.)

In one embodiment, the system 100 also includes a secondary bus 64. Illustrative secondary buses include the Universal Serial Bus and Peripheral Component Interconnect buses. (See the "Universal Serial Bus (USB) Specification," revision 1.0, January 1996; and the "Peripheral Component Interconnect (PCI) Specification, revision 2.15, is available from The PCI Special Interest Group, Portland, Oreg. 97214.)

Coupled between the host bus 62 and the secondary bus 64, in one embodiment, is a North Bridge 60. The North Bridge 60 is a multiple function element that operates as a bridge between the buses 62 and 64. In one embodiment, the North Bridge 60 includes a memory controller. The North Bridge 60 also performs arbitration between requests from each of the processors 10a, 10b and 10c for system resources.

One of the arbitrated resources in the system 100 is the memory 20 that is connected to the North Bridge 60. In one embodiment, the North Bridge 60 also supports the ROM 12, for storing the BIOS program 14. The system 100 further includes a non-volatile storage 18, such as for storing the operating system 16. Alternatively, the operating system 16 may be downloaded to the system 100 from a network. A network interface card (NIC) 26 is connected to the secondary bus 64, in one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    passing control of at least one portion of a processor-based system to an operating system loaded on the processor-based system; and
    retaining control of a second portion of the processor-based system by a power-on program,
    retaining control of a second portion of the processor-based system further comprising retaining control of at least one processor of a plurality of processors.

2. The method of claim 1, retaining control of at least one processor of a plurality of processors further comprising:
    identifying the plurality of processors available to the system in a table readable by the operating system;
    notifying the operating system that the plurality of processors are available; and
    declining to include the at least one processor in the table.

3. The method of claim 2, running both the power-on program and the operating system simultaneously further comprising;
    executing the power-on program by the at least one processor of the plurality of processors; and
    executing the operating system by a second processor, wherein the second processor is identified in the table.

4. A method comprising:
    passing control of at least one portion of a processor-based system to an operating system loaded on the processor-based system;
    retaining control of a second portion of the processor-based system by a power-on program;
    running both the power-on program and the operating system program simultaneously;
    retaining a portion of a memory by the power-on program;
    performing memory operations on the retained portion of the memory by the power-on program while the operating system is running;
    relinquishing a second portion of the memory to the operating system; and
    performing memory operations on the relinquished portion of the memory by the operating system while the power-on program is running.

5. A method comprising:
    passing control of at least one portion of a processor-based system to an operating system loaded on the processor-based system;
    retaining control of a second portion of the processor-based system by a power-on program;
    running both the power-on program and the operating system program simultaneously;
    retaining a portion of a memory by the power-on program;
    performing memory operations on the retained portion of the memory by the power-on program while the operating system is running;
    performing memory operations on the retained portion of the memory by the power-on program while the operating system is running further comprising:
    initializing the retained portion of memory; and
    testing the retained portion of memory.

6. A system comprising:
    a first storage to store a power-on program;
    a second storage to store an operating system;
    a first element controlled by the operating system;
    a second element controlled by the power-on program,
    wherein the first element is a first processor and the power-on program executes on the first processor,
    wherein the second element is a second processor and the operating system executes on the second processor, and
    a configuration table accessible to both the power-on routine and the operating system to identify the first element.

7. An article comprising a medium storing instructions to enable a processor-based system to:
    pass control of at least one portion of the processor-based system to an operating system loaded on the processor-based system;
    retain control of a second portion of the processor-based system by a power-on program;

run both the power-on program and the operating system program simultaneously;

retain a portion of a memory by the power-on program;

perform memory operations on the retained portion of the memory by the power-on program while the operating system is running;

relinquish a second portion of the memory to the operating system; and perform memory operations on the relinquished portion of the memory by the operating system while the power-on program is running.

8. The article of claim 7, further storing instructions to enable a processor-based system to:

identify the plurality of processors available to the processor-based system in a table readable by the operating system;

notify the operating system that the plurality of processors are available; and decline to include at least one processor of the plurality of processors in the table.

9. The article of claim 8, further storing instructions to enable a processor-based system to:

execute the power-on program by the at least one processor of the plurality of processors; and execute the operating system by a second processor, wherein the second processor is identified in the table.

10. A system comprising:

two or more processors;

a device comprising a first portion and a second portion, wherein the device is coupled to the two or more processors; and a power-on routine executable by one of the two or more processors, wherein the power-on routine relinquishes control of the first portion of the device before loading an operating system, wherein the power-on routine further:

tests the second portion of the device while the operating system is running; and relinquishes control of the second portion of the device to the operating system.

11. The system of claim 10, wherein the device is a memory.

12. The system of claim 10, wherein the device is a group of processors and the first portion of the device is a first processor and the second portion of the device is a second group of processors.

13. A system comprising:

two or more processors;

a device comprising a first portion and a second portion, wherein the device is coupled to the two or more processors;

an operating system executable by one of the two or more processors, wherein the operating system receives control of the first portion of the device when the operating system is executed; and a power-on routine to relinquish control of the first portion of the device to the operating system, wherein the operating system further:

receives an interrupt from the power-on routine; and receives control of the second portion of the device.

* * * * *